(12) United States Patent
Braidotti

(10) Patent No.: US 10,682,017 B2
(45) Date of Patent: Jun. 16, 2020

(54) HAMBURGER MOLD

(71) Applicant: Nely Cristina Braidotti, Bauru (BR)

(72) Inventor: Nely Cristina Braidotti, Bauru (BR)

( * ) Notice: Subject to any disclaimer, the term of this patent is extended or adjusted under 35 U.S.C. 154(b) by 262 days.

(21) Appl. No.: 15/439,999

(22) Filed: Feb. 23, 2017

(65) Prior Publication Data

US 2017/0360257 A1 Dec. 21, 2017

(30) Foreign Application Priority Data

Jun. 17, 2016 (BR) ...................... 20 2016 014403-0

(51) Int. Cl.
*A47J 43/20* (2006.01)
*A22C 7/00* (2006.01)

(52) U.S. Cl.
CPC ............. *A47J 43/20* (2013.01); *A22C 7/0046* (2013.01); *A22C 7/0076* (2013.01)

(58) Field of Classification Search
CPC ... A22C 7/0046; A22C 7/0076; A22C 7/0023; A47J 43/20
USPC ......................................................... 425/470
See application file for complete search history.

(56) References Cited

U.S. PATENT DOCUMENTS

| 2,484,460 | A | * | 10/1949 | Pedro | ........................ | A22C 7/00 |
| | | | | | | 425/318 |
| 3,654,665 | A | * | 4/1972 | Holly | ........................ | A22C 7/00 |
| | | | | | | 425/562 |
| 3,909,881 | A | * | 10/1975 | Anderson | ............. | A22C 7/0007 |
| | | | | | | 425/116 |
| 4,443,176 | A | * | 4/1984 | Battistone | ............ | A22C 7/0076 |
| | | | | | | 249/66.1 |
| 6,194,017 | B1 | * | 2/2001 | Woodward | ............. | A21C 11/12 |
| | | | | | | 425/290 |
| D595,998 | S | * | 7/2009 | Hauser | ................... | B29C 43/003 |
| | | | | | | D7/672 |
| 8,038,118 | B1 | * | 10/2011 | Ajakie | ..................... | A47J 43/20 |
| | | | | | | 249/156 |
| 2005/0095334 | A1 | * | 5/2005 | Messina | .................. | A21C 11/08 |
| | | | | | | 426/512 |
| 2005/0212156 | A1 | * | 9/2005 | Tokita | ................... | B29C 43/003 |
| | | | | | | 264/1.36 |
| 2008/0175968 | A1 | * | 7/2008 | Bloom | ................. | A22C 7/0046 |
| | | | | | | 426/512 |

(Continued)

FOREIGN PATENT DOCUMENTS

| GB | 1510451 | * | 3/1977 | |
| GB | 2290216 A | * | 12/1995 | ............. A23L 19/19 |

(Continued)

*Primary Examiner* — Seyed Masoud Malekzadeh
*Assistant Examiner* — Guy F Mongelli
(74) *Attorney, Agent, or Firm* — Schmeiser, Olsen & Watts, LLP

(57) ABSTRACT

A hamburger mold is provided, which refers to a mold that aims to greatly facilitate the preparation of handmade hamburgers, besides allowing the achievement of hamburgers of several formats, in relation to its thicknesses or containing or no containing fillings. Therefore, the disclosed embodiments present a singular and unique constructiveness, by the fact that the cradle in which the raw material of the hamburger is accommodated, is mobile and stands out from the main body. This feature even reduces or simplifies the cleaning and handling of the present mold for the preparation of hamburgers.

1 Claim, 2 Drawing Sheets

(56) References Cited

U.S. PATENT DOCUMENTS

2009/0246311 A1* 10/2009 Hauser .................... A47J 43/20
                                                      425/519
2010/0239735 A1*  9/2010 Robbins ............... A22C 7/0046
                                                      426/513
2013/0167735 A1*  7/2013 Guarnotta ........... A47J 37/0664
                                                       99/343

FOREIGN PATENT DOCUMENTS

GB       2355173    *  4/2001
IE        990853    * 10/2001

* cited by examiner

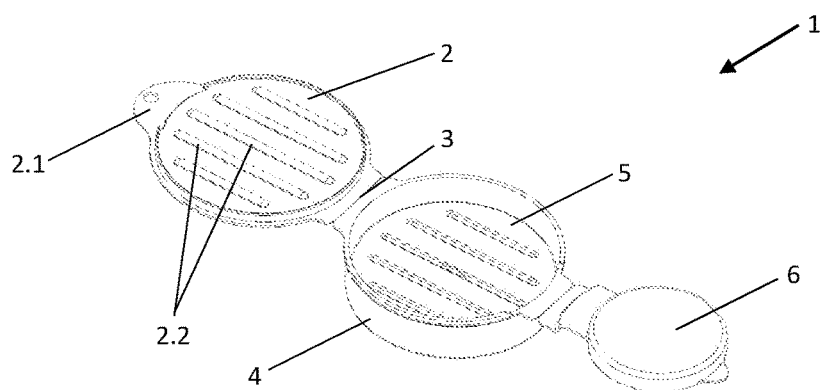
FIG. 1
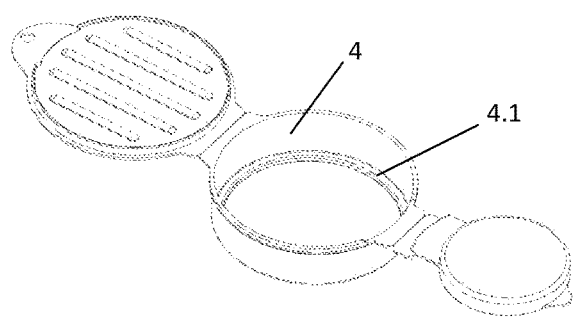
FIG. 2
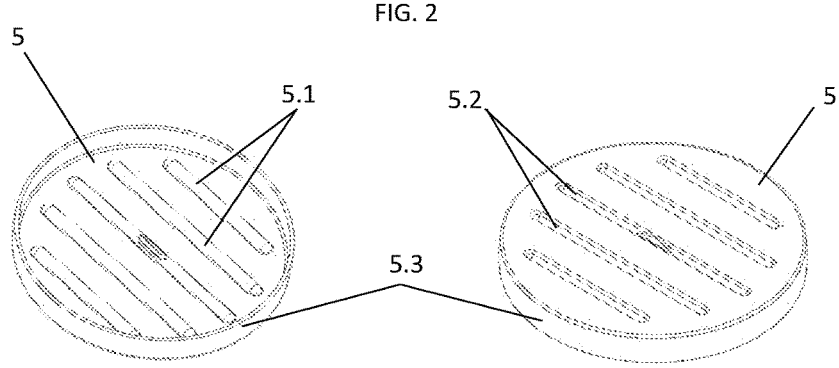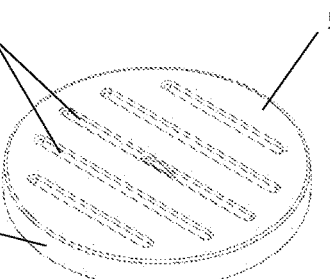
FIG. 3  FIG. 4
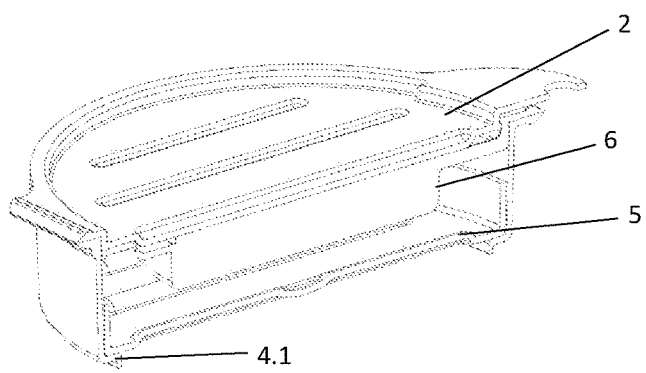
FIG. 5

HAMBURGER MOLD

CROSS-REFERENCE TO RELATED APPLICATIONS

This application claims priority to Brazilian Application No. 30 2016 014403-0, having a filing date of Jun. 17, 2016, the entire contents of which are hereby incorporated by reference.

FIELD OF TECHNOLOGY

The following refers to an innovative and unique way of preparation of handmade hamburgers.

Said mold presents a simplified constructive structure of uncomplicated use and handling, allowing the preparation of handmade hamburgers with professional look, offering ease assembly, disassembly and cleaning of the mold after use.

Furthermore, by using this mold or form, it is possible to prepare hamburgers with a filling in its central portion, a unique characteristic among similar forms found in the state of the art.

BACKGROUND

As widely known by professionals of the houseware industry, and especially by the consumer public, the market offers few options of molds for the preparation of handmade hamburgers.

Typically, the molds for hamburger preparation found in the state of art have the form of a hollow cylinder, of low height, where the raw material for the hamburger is accommodated.

The removal of the raw material of the hamburger is usually not very simple, requiring the user to tap the cylinder or to make 'up and down' movements on the cylinder, causing the hamburger to peel off and fall over the surface of preparation. These tasks often end up by unmolding the hamburger, or the hamburger usually loses its conventional shape.

Some models found in the state of the art comprise a handle on the hollow cylinder, which facilitates the removal of the raw material of the hamburger from inside of the cylinder. However, even so, it is not the easiest, simplest and most convenient way to prepare handmade hamburgers.

SUMMARY

An aspect relates to the preparation of a mold-made hamburger, besides enabling the achievement of hamburgers of several formats, whether regarding its thicknesses, or containing or no containing fillings.

Therefore, embodiments of the present invention have a singular and unique constructiveness, in which the cradle where the raw material of the hamburger is accommodated is mobile and can be removed from the main body. This feature even reduces or simplifies the cleaning and handling of the present mold for the preparation of hamburgers.

BRIEF DESCRIPTION

Some of the embodiments will be described in detail, with reference to the following figures, wherein like designations denote like members, wherein:

FIG. 1 shows a front perspective view of the mold for hamburger preparation in an open position;

FIG. 2 shows another front perspective view of the mold for hamburger preparation in an open position, without the accommodation cradle for the hamburger;

FIG. 3 shows a top view of the accommodation cradle for the hamburger;

FIG. 4 shows a lower view of the accommodation cradle for the hamburger;

FIG. 5 shows a perpendicular cut view of the mold for hamburger preparation, in a closed position;

DETAILED DESCRIPTION

Figure 6:
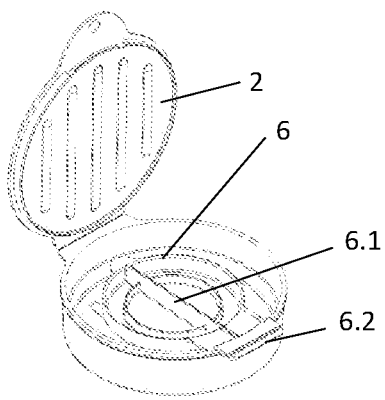
FIG. 6 shows the movement of the hinged overcap for shaping the filling portion.
Figure 7:
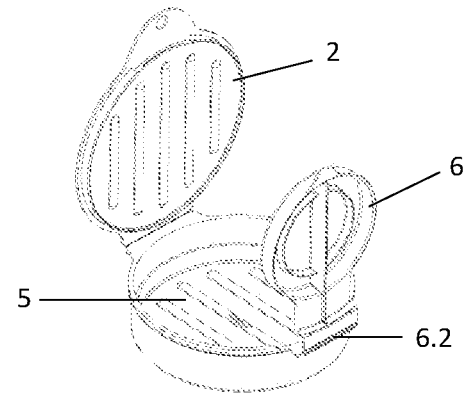
FIG. 7 shows the movement of the hinged overcap for shaping the filling portion in a second position.
Figure 8:
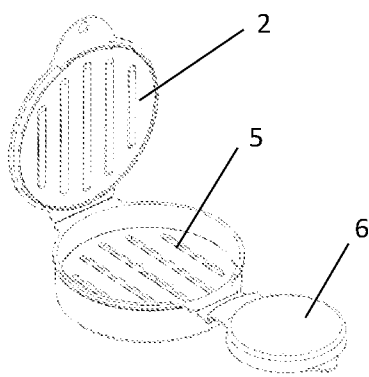
FIG. 8 shows the movement of the hinged overcap for shaping the filling portion in a third position.
Figure 9:
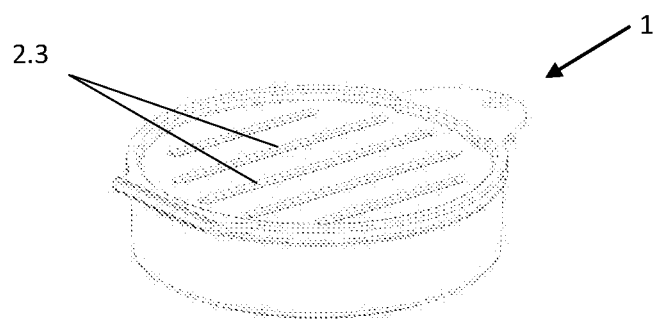
FIG. 9 shows a front perspective view of the mold for hamburger preparation in a closed position.

According to the illustrations of the above mentioned figures, the present invention "HAMBURGER MOLD" refers to a mold (1), preferably produced of thermoplastic material or other material with similar characteristics, provided, in general, with a hollow main body (4), a cradle (5) for the hamburger accommodation, a hinged cap (2) and a hinged overcap (6).

Said mold (1) has a circular and hollow main body (4) of low height, forming a ring. In a portion of the upper edge, the main body (4) comprises a hinge (3), responsible for the articulation ('open and close' movement) of the cap (2), and at the opposite distal portion of the hinge (3) there is another hinge (6.2), this one responsible for the articulation ('open and close' movement) of the overcap (6).

The lower edge of said main body (4) has, around its full perimeter, a projection (4.1) bent towards the center of the body, forming a sort of support for the cradle (5) for the accommodation of the hamburger.

The cap (2), which is connected to said main body (4) through the hinge (3) comprises, at the opposite end of said hinge (3) a tab (2.1), which promotes and facilitates the 'open and close' movement of the cap (2) when the mold (1) is being used.

Said cap (2) also incorporates a series of projections (2.2), aligned parallel and equidistant from adjacent projections, arranged on the inner face of the cap (2), which coincide with the recesses (2.3) arranged on the inner face of the cap (2). These projections (2.2) and recesses (2.3) have a lucid appeal likened to a grid, on which the hamburgers are grilled such that molded hamburgers will have indentations similar to those which appear when a hamburger is cooked on a grill.

The cradle (5), on which the hamburger is accommodated, is positioned and supported by the projection (4.1) found in the lower perimeter of the main body (4), such that, when the mold (1) is closed, the hamburger becomes shaped and prepared.

Said cradle (5) incorporates additional projections (5.1) aligned parallel and equidistant from adjacent projections, arranged on the inner face of the cradle (5), which coincide with the recesses (5.2) arranged on the inner face of the cradle (5). Like the projections (2.2) and recesses (2.3), said projections (5.1) and recesses (5.2) have a lucid appeal likened to a grid, on which the hamburgers are grilled such that molded hamburgers will have indentations similar to those which appear when a hamburger is cooked on a grill.

Said cradle (5) can be positioned and supported on the projection (4.1), with the projections (5.1) facing up as well with the recesses (5.2) facing up. This positional modularity is possible because the cradle (5) has a surrounding wall (5.3) equivalent to half the height of said main body (4), which allows the preparation of hamburgers of two heights.

As mentioned hereinbefore, the cradle (5) can be used in two positions up and down. If a user of the hamburger meat molding apparatus wants to prepare a thicker hamburger, he just needs to place the bottom of the cradle (5) turned down in the main body (4). If he wants to prepare a thinner hamburger, he just needs to place the bottom of the cradle (5) turned up in the main body (4).

Said overcap (6) is connected to the main body (4) through the hinge (6.2), and comprises a projection (6.1) on its outer face, which promotes and facilitates the 'open and close' movement of the overcap (6), when the mold (1) is being used.

The overcap (6) has the function of conforming a depression on the hamburger, in order to accommodate fillings, depending of the taste and interest of the user. After the user accommodates the raw material of the hamburger in the cradle (5), after attaching it to the main body (4), the user can, through the overcap (6), conform a depression in the hamburger, which can be used to dispense some filling.

If the user does not want to prepare a hamburger with a filling, he simply leaves the overcap (6) pivoted outside, when closing the cap (2) for the hamburger conformation.

The whole constructivity of mold (1) allows the preparation of several types of hamburgers, of either greater or lesser thicknesses, with a depression for dispensing the filling, or without a depression. Furthermore, as the cradle (5) is detachable, it allows an easier preparation of the hamburger as well as an easier cleaning of the mold (1).

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A hamburger mold, comprising:
a mold having a main body;
a reversible cradle configured to accommodate a hamburger, the reversible cradle configured to be moved between a first position and a second position;
an articulated cap; and
an articulated overcap;
wherein the main body has a circular and hollow shape forming a ring with a sidewall, wherein a top and a bottom of the main body are open,
the main body comprising a first hinge at a portion of the top edge, a second hinge at the opposite distal portion to the first hinge, and a bent projection extending from the sidewall of the main body towards a center of the main body around a perimeter;
the articulated cap comprising a tab located at the opposite end to the first hinge, a first series of projections located on an inner face of the articulated cap, and a first series of recesses located on an outer face of the articulated cap;
the reversible cradle comprising a second series of projections arranged on an inner face of the reversible cradle, the second series of projections aligned parallel, and a second series of recesses arranged on an outer face of the reversible cradle, wherein the reversible cradle is placed inside the main body and sits on the projection of the main body;
wherein, when the reversible cradle is disposed in the first position, the inner face of the reversible cradle faces upward and the outer face of the reversible cradle faces downward, and when the reversible cradle is disposed in the second position, the inner face of the reversible cradle faces downward and the outer face of the reversible cradle faces upward, such that in a closed position of the hamburger mold when the reversible cradle is in the first position, a gap is formed between the cap and the inner face of the reversible cradle, and the outer surface of the reversible cradle contacts the bent projection of the main body;
wherein a surrounding side wall of the reversible cradle extends upwards from the lip of the main body towards the top of the main body, in the first position of the hamburger mold.

\* \* \* \* \*